United States Patent
Mason et al.

(10) Patent No.: US 7,374,186 B2
(45) Date of Patent: *May 20, 2008

(54) REMOVABLE CASTER SYSTEM

(75) Inventors: Kevin J. Mason, Chesterfield, VA (US); Steven O. Stubblefield, Mechanicsville, VA (US); Steven L. Rembisz, Midlothian, VA (US)

(73) Assignee: Dover Systems, Inc., Duluth, GA (US)

(*) Notice: Subject to any disclaimer, the term of this patent is extended or adjusted under 35 U.S.C. 154(b) by 36 days.

This patent is subject to a terminal disclaimer.

(21) Appl. No.: 11/224,264

(22) Filed: Sep. 12, 2005

(65) Prior Publication Data

US 2006/0066065 A1    Mar. 30, 2006

Related U.S. Application Data

(60) Provisional application No. 60/614,078, filed on Sep. 29, 2004.

(51) Int. Cl.
*B62B 1/00* (2006.01)

(52) U.S. Cl. .............. 280/79.11; 280/79.3; 280/47.131; 280/47.34

(58) Field of Classification Search ............... 280/79.3, 280/79.11, 79.7, 35, 43.24, 47.131, 639, 47.34; 211/26, 189
See application file for complete search history.

(56) References Cited

U.S. PATENT DOCUMENTS

| | | | |
|---|---|---|---|
| 1,778,654 A | * | 10/1930 | Wright .................... 280/79.11 |
| 3,558,152 A | | 1/1971 | Miles et al. |
| 3,633,774 A | * | 1/1972 | Lee ......................... 280/79.11 |
| 3,809,261 A | | 5/1974 | Lee |
| 3,897,053 A | * | 7/1975 | Guy .......................... 271/238 |
| 4,166,638 A | | 9/1979 | De Prado |
| 4,227,281 A | | 10/1980 | Chung et al. |
| 4,597,615 A | | 7/1986 | Steger |
| 4,843,678 A | | 7/1989 | Park |
| 4,921,264 A | | 5/1990 | Duffy |
| 5,136,751 A | | 8/1992 | Coyne et al. |
| 5,269,501 A | | 12/1993 | Liegel et al. |
| 5,299,659 A | | 4/1994 | Imbeault et al. |
| 5,372,262 A | * | 12/1994 | Benson et al. ................ 211/26 |
| 5,428,866 A | | 7/1995 | Aschow |
| 5,457,849 A | | 10/1995 | Branson et al. |
| 5,475,987 A | | 12/1995 | McGovern |

(Continued)

FOREIGN PATENT DOCUMENTS

GB          2043549 A  * 10/1980

*Primary Examiner*—Hau Phan
(74) *Attorney, Agent, or Firm*—Foley & Lardner LLP

(57) ABSTRACT

A system for moving a refrigeration device is disclosed and includes a frame for supporting the refrigeration device. At least one pair of stationary casters are removably coupled to the frame. At least one pair of adjustable casters are removably coupled to the frame and are adjustable relative to the frame within a range between an extended position and a retracted position. A positioner provided on at least one of the frame and the adjustable casters establishes a position for the adjustable casters relative to the frame within the range, so that the stationary casters and the adjustable casters are capable of providing a desired degree of stability during movement of the refrigeration device and the stationary casters and the adjustable casters are removable following movement of the refrigeration device.

8 Claims, 4 Drawing Sheets

U.S. PATENT DOCUMENTS

| | | |
|---|---|---|
| 5,575,036 A | 11/1996 | May |
| 5,599,031 A * | 2/1997 | Hodges .................... 280/79.11 |
| 5,934,639 A | 8/1999 | Chiang et al. |
| 5,971,408 A | 10/1999 | Mandel et al. |
| 5,980,008 A * | 11/1999 | Stoever ................... 280/47.34 |
| 6,098,761 A * | 8/2000 | Kooima et al. .......... 280/47.34 |
| 6,109,625 A * | 8/2000 | Hewitt .................... 280/43.24 |
| 6,406,248 B1 | 6/2002 | McGill et al. |
| 6,450,515 B1 | 9/2002 | Guth |
| 6,497,311 B2 | 12/2002 | Tiramani et al. |
| 6,520,514 B2 | 2/2003 | Clegg |
| 6,669,213 B2 | 12/2003 | Woerner |
| 2003/0127815 A1* | 7/2003 | Hall .......................... 280/79.3 |
| 2003/0201619 A1* | 10/2003 | Teng et al. ............... 280/79.11 |

* cited by examiner

REMOVABLE CASTER SYSTEM

CROSS REFERENCE TO RELATED APPLICATIONS

This Application claims the benefit of priority under 35 U.S.C. § 119(e) of U.S. Provisional Patent Application No. 60/614,078 titled "Removable Caster System" filed on Sep. 29, 2004, which is incorporated herein by reference in its entirety.

BACKGROUND

The present inventions relate generally to the field of casters for moving heavy objects. More specifically, the present inventions relate to a removable caster system for use with refrigeration equipment, refrigeration systems and electrical distribution equipment.

Casters for use in certain applications are generally known to facilitate movement or mobility of heavy objects and the like. Such casters are typically attached to the object in a fixed manner and may include "brakes" or the like to "lock" the casters and prevent movement of the object. Casters may also be removably attached to an object. For example, casters may be attached to a platform and used as a dolly beneath the objects and then the dolly may be removed when the movement of the object is completed. Casters may also be removably coupled to brackets configured for use with a particular object. However, such casters have certain disadvantages. For example, such known removable casters are often not readily adaptable for use with objects having varying sizes, shapes, or base frame configurations. The known removable casters may also not be suitable for moving certain objects that are "top heavy" or the like where instability of the object may lead to "tipping" of the object during movement.

Accordingly, it would be desirable to provide a removable caster system having any one or more of these or other advantageous features:
1. A removable caster system having a connection mechanism configured for quickly installing the caster and removing the caster from an object.
2. A removable caster system having an extendable and retractable outrigger or other telescoping member configured to adjust the spacing between adjacent casters as desirable to improve the stability of an object when moving the object (e.g. objects that are top heavy, tall, etc.).
3. A removable caster system having an interface adapted to removably mount the casters to a wide variety of objects to be moved.
4. A removable caster system for use with a refrigerated display case, such as a type used in a supermarket.
5. A removable caster system for use with an electrical distribution panel.
6. A removable caster system for use with a refrigeration system equipment rack.

DETAILED DESCRIPTION

Certain objects such as refrigerated-type display cases, racks for mounting refrigeration equipment (e.g. compressors, motors, etc.) and cabinets or panels containing electrical or electronic equipment (e.g. electrical distribution panels and the like) are typically heavy and include a base (e.g. frame members, feet, etc.) configured to rest upon, or be supported by, a floor or other suitable surface in a generally non-movable manner when the object has been positioned at a desired location within an installation site (e.g. store, factory, facility, etc.). When movement of the object is required, such as during transport during manufacturing or delivery from the manufacturer, initial installation, or remodeling or other reconfiguration of the installation site, it may be desirable to provide a removable caster system attachable to the object so that the object may be more readily moved or relocated as required.

The removable caster system is intended to provide a simpler and more cost-effective apparatus and method for attaching casters to objects when movement of the objects is required, and to permit removal of the casters when movement of the object is completed.

Figure 1:
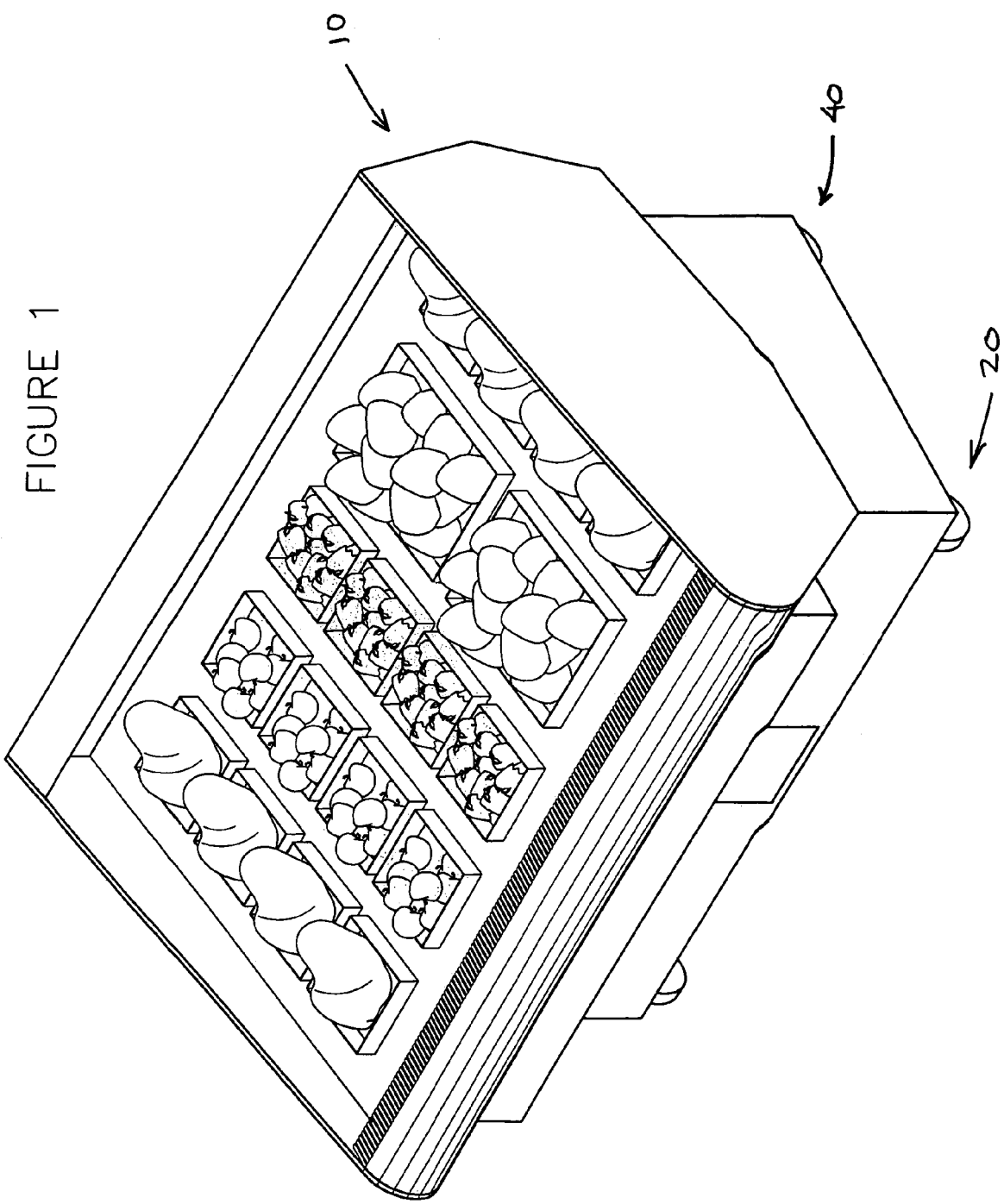
FIG. 1 is a schematic image of a refrigerated case having a removable caster system according to one embodiment.

Referring to FIG. 1, an object 10 shown schematically for example as a refrigerated case is shown for use with a caster system according to one embodiment. According to other embodiments, the object may be a refrigeration system rack or an electrical distribution panel of the like. All such objects are intended to be within the scope of the subject matter of the invention.

Figure 2:
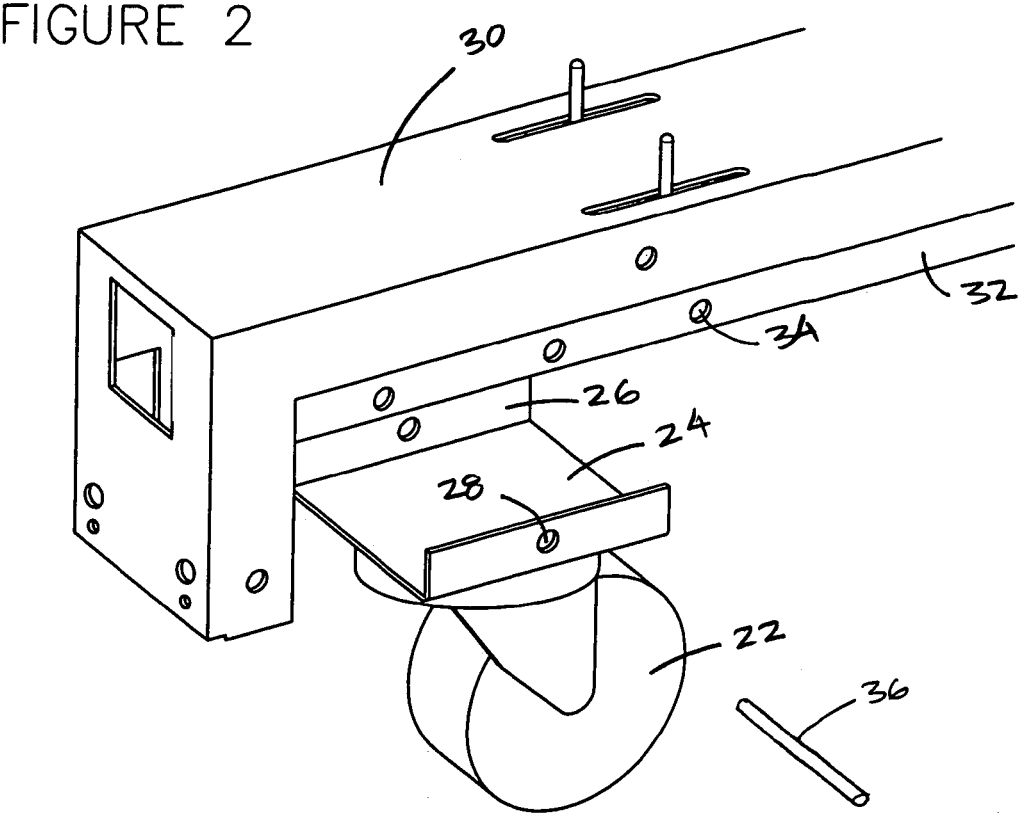
FIG. 2 is a schematic image of an exploded perspective view of a removable caster system according to one embodiment.
Figure 3:
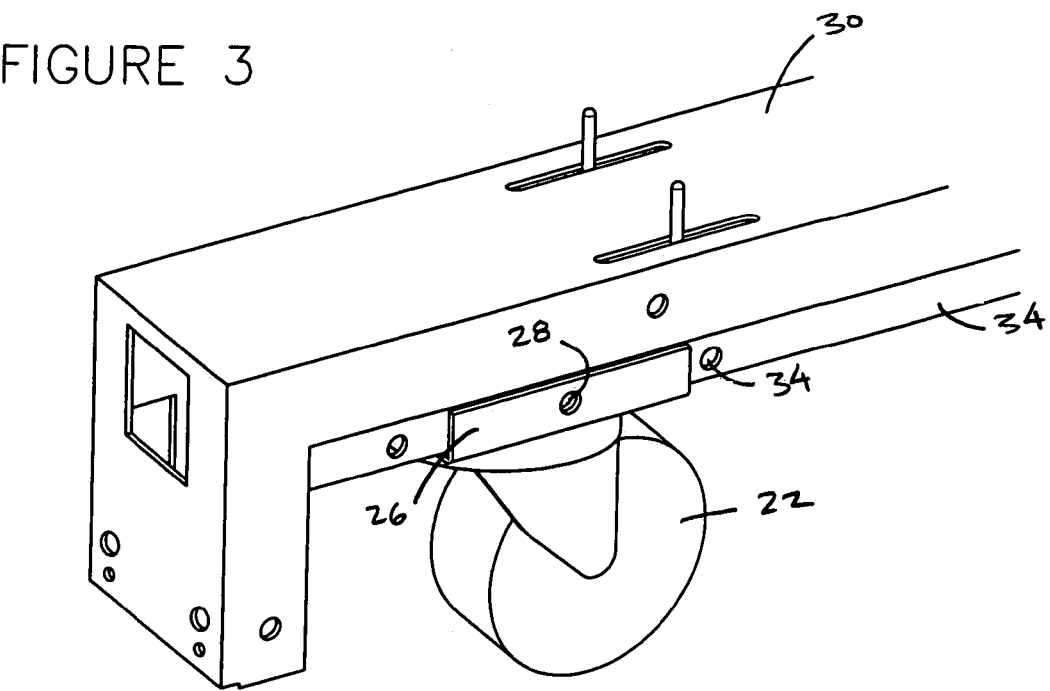
FIG. 3 is a schematic image of a perspective view of the removable caster system according to the embodiment of FIG. 2.

Referring to FIGS. 2-3, a removable caster system 20 is shown according to one embodiment. The removable caster system 20 is shown to include a generally flat caster mounting base 24 having upright flanges 26 on opposing sides with a mounting aperture 28 located at approximately the center of the flanges 26.

A base frame member 30 is shown provided along a bottom or underside of object 10 (e.g. refrigerated display case, refrigeration equipment rack, electrical distribution panel, etc.). A lower rail 32 of the base frame member 30 includes at least one pair of apertures 34 (i.e. one aperture on each side of the frame member) (shown for example as three pairs of apertures) that is intended to align with the apertures 28 on the upright flanges 26 extending from the mounting base 24 of a caster 22. The pairs of apertures 34 are intended to define various locations along the base frame member 30 for adjustably and removably coupling the caster 22 to the base frame member 30 of the object 10. In this manner, the caster 22 may be removably coupled to the object by sliding a pin member 36 (e.g. rod, screw, bolt, other similar fastener, etc.) through the apertures 28 on the upright flanges 26 of the caster and through a corresponding pair of apertures 34 in the base frame member 30.

The pin member 36 can be inserted through the holes on the upright flanges and the base frame member to secure the caster to the object. When movement of the object 10 has been completed, the pin member 36 and caster 22 may be removed, so that the object 10 may be supported by it's base (e.g. adjustable legs or the like).

According to alternative embodiments, the mounting base of the caster and the base frame member may include other engaging structure configured to couple the caster to the frame member. For example, the mounting base of the caster may include upwardly extending projections (e.g. pins, rods, bars, ribs, etc.) configured to interlock with a series of corresponding receiving structure on the base frame member (e.g. recesses, pockets, apertures, etc.) at a desired location along the base frame member (with or without the use of separate retaining pins).

According to another alternative embodiment, the mounting base of the caster may be configured to slide along at least a portion of the base frame member and may be provided with positioning devices, such as detents or the like, that tend to align the aperture in the upright flange of the caster with the pair of apertures in the frame member.

According to a further alternative embodiment, the aperture in the upright flange may be positioned to permit the mounting base of the caster to pivot between a mobile position where the caster wheel engages a floor surface (or the like) and an immobile position where the caster wheel no longer engages the floor surface.

Figure 4:
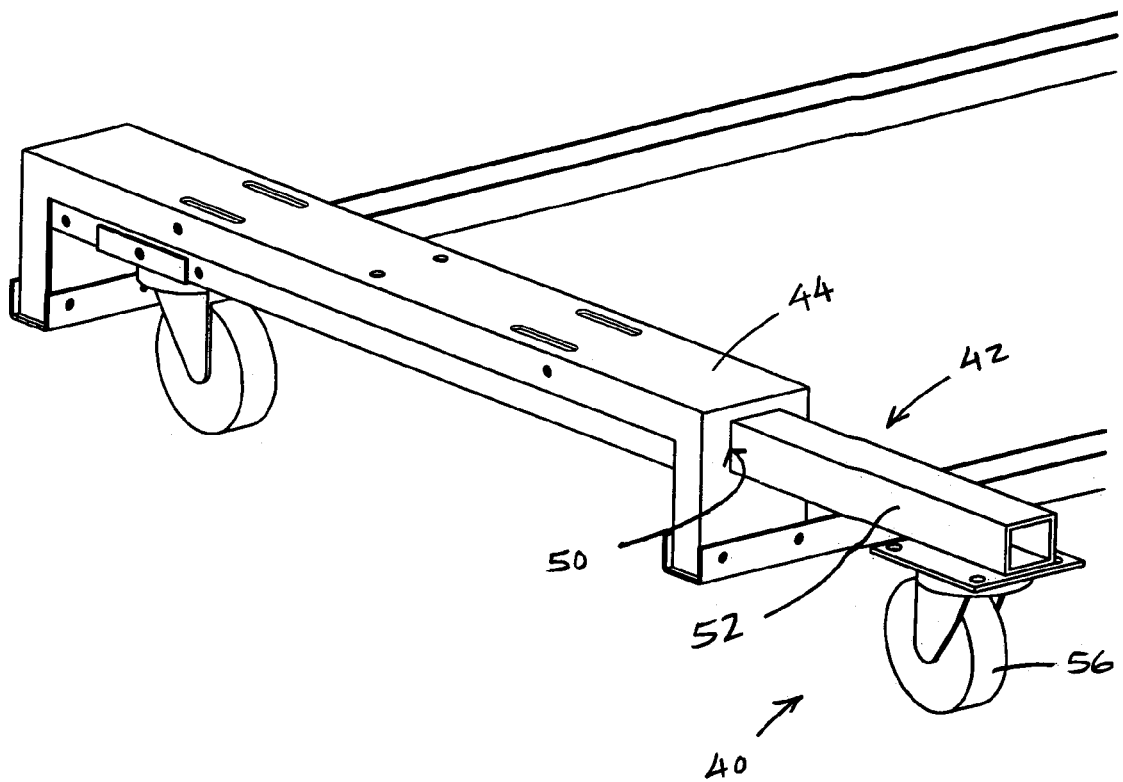
FIG. 4 is a schematic image of a perspective view of a removable caster system according to another embodiment.
Figure 5:
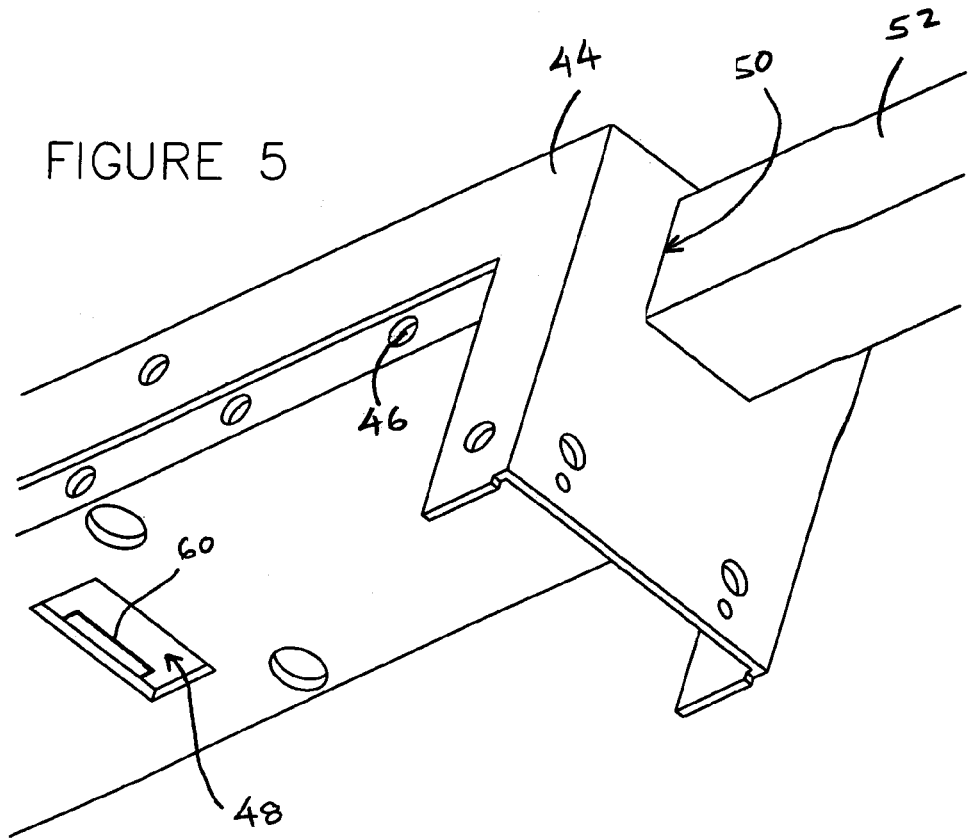
FIG. 5 is a schematic image of a perspective view of a portion of the removable caster system according to the embodiment of FIG. 4.
Figure 6A:
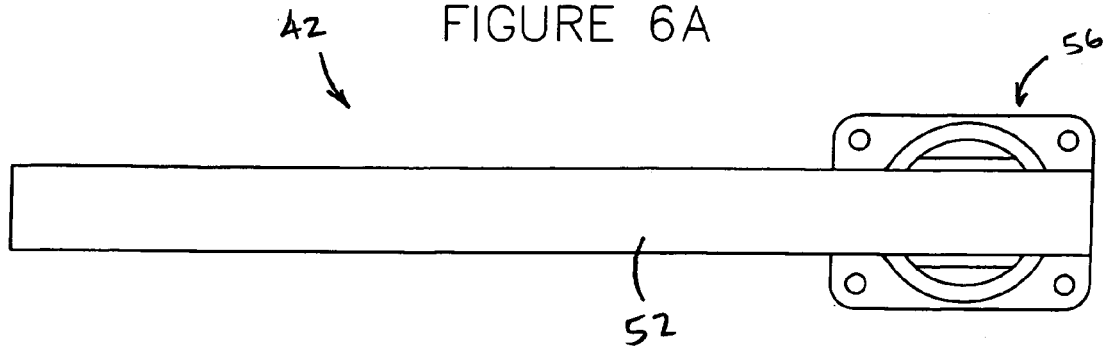
FIGS. 6A-6B are schematic representations of a top view and front view of a removable caster system according to the embodiment of FIG. 4.
Figure 6B:
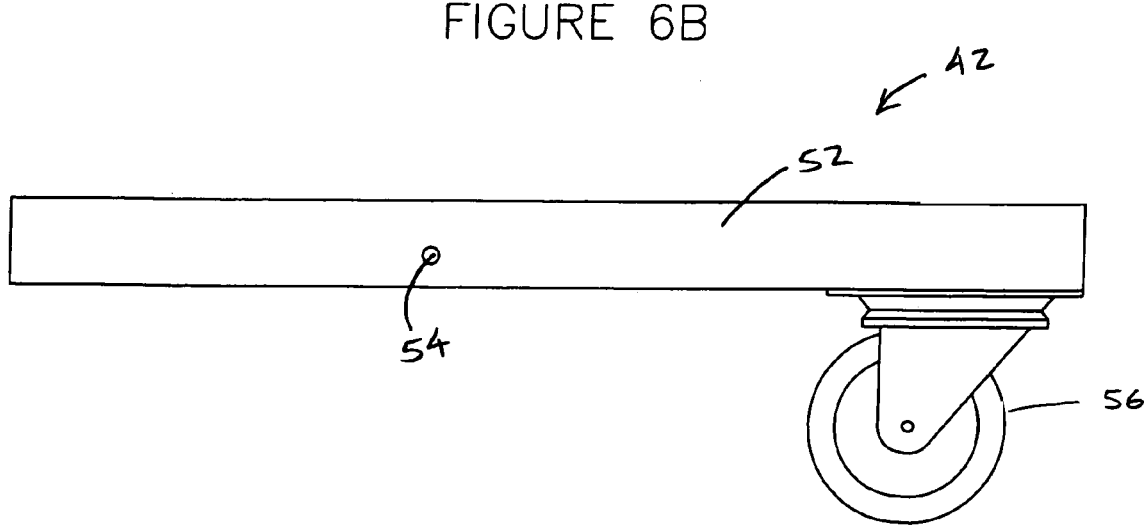

Referring to FIGS. 4-6, a second embodiment of a removable caster system 40 is shown to include an extendable and retractable (e.g. telescoping, etc.) member such as a "stabilizer" or an "outrigger" to increase the distance between adjacent casters and intended to improve stability of the object 10 during movement with the removable caster system 40.

Removable caster system 40 is intended for use with objects that may experience instability during movement of the object (e.g. objects that are sufficiently narrow or top-heavy, movement of an object over a surface having discontinuities or irregularities, etc.) where movement of the object may result in "tipping" or other unintended movement or instability of the object, by "stretching" or "expanding" the "footprint" of the removable caster system relative to the object.

Removable caster system 40 includes a telescopingly extendable and retractable "outrigger device" 42 as shown in FIGS. 4-6 and is intended for use with a base frame member 44 on the object 10. The embodiment shown in FIG. 4 includes an outrigger device 42 on one end of the base frame member 44 and a removable caster 22 (as described in relation to FIGS. 2-3) on an opposite end of the base frame member 44. It should be noted that the base frame member may be configured for use with an outrigger device on each end of the base frame member.

The base frame member 44 is shown to include one or more pairs of retainer apertures 46 (as previously described in relation to FIGS. 2-3). The base frame member 44 is also shown to include an internal passage 48 communicating with an opening 50 configured to receive an extensible member (shown as an outrigger tube 52) in either a fixed or telescoping relationship.

The outrigger tube 52 may be made of any suitable material such as metal tubing (e.g. steel, aluminum, etc.), wood, plastic, or the like having sufficient strength to support the object 10 when the outrigger tube 52 is fully extended from the base frame member 44. Retainer apertures 54 (shown as one pair of retainer apertures) are provided along the length of the outrigger tube 52 and configured to align with the retainer apertures 46 on the base frame member 44, so that the outrigger tube 52 is adjustable between a fully retracted position in the base frame member 44 and a fully extended position from the base frame member 44.

A removable pin member (e.g. such as a pin, rod, bolt, screw, etc.—similar to pin member 36) is provided and is intended for insertion through the retainer apertures 54 in the outrigger tube 52 and the base frame member 44, to "lock" the outrigger tube 52 in a desired position with the base frame member 44.

A caster 56 is shown attached to a first (e.g. outward) end of the outrigger tube 52 (e.g. by fasteners, welding, molding or the like), and is intended to provide a mobile interface between the outward end of the outrigger tube and a surface (e.g. floor, etc.) over which the object is to be moved.

A positioner 60 (shown as an outrigger tube position holder) is coupled to the base frame member 44 and is intended to position the outrigger tube 52 axially along the base frame member 44 at a predetermined location, and also to minimize lateral (e.g. side-to-side) movement of the outrigger tube 52 within the passage 48 of the base frame member 44. The positioner 60 may be formed from a portion of the base frame member 44 (such as a "tab" or "ear" formed by stamping or the like) or the positioner may be attached as a separate member to the base frame member. According to an alternative embodiment, the positioner may comprise a ratchet and pawl type device or the like. For example, the outrigger tube may be provided with a series or row of projections (e.g. teeth, etc.) configured to interact with a pawl or other suitably releasable device on the base member. The pawl may be configured for release by any suitable device such as foot lever and linkage on the base frame member or the object. By further way of example, the outrigger tube may be positioned within the base frame member by a spring-biased detent arrangement, such as spring-loaded pins that extend from the outrigger tube for engaging the retainer apertures in the base frame member (or suitable "pockets' or "recesses" or the like formed in the base frame member).

The outrigger tube 52 may be installed on the base frame member 44 at any desirable location for the particular object to be moved and the amount of stability desired, and secured temporarily by installing the pin member through aligned retainer apertures 54 on the outrigger tube 52 and apertures 46 on base frame member 44. After movement of the object 10 is completed, the outrigger tube 52 may be removed by withdrawing the pin member and the outrigger tube 52 from the base frame member 44.

The second embodiment of the removable caster system is intended to avoid the need for attaching a separate mating tube or bracket to the object for receiving the outrigger tube. The base frame member for the objects may be designed with a square hole (or other suitable shape corresponding to the cross-sectional shape of the outrigger tube) so that any one or more product lines (e.g. refrigerated display cases, refrigeration system equipment racks, electrical distribution panels or cabinets, etc.) may be configured to universally receive the outrigger device.

According to an alternative embodiment, the outrigger tube may be configured to be "foldably" or "pivotally" attached to the base frame member (e.g. by a hinge, pivot point, or the like) for movement between a retracted position and any one of a variety of extended positions relative to the object (e.g. along a side, an end, a corner, etc.).

According to any embodiment, the removable caster system is intended to provide a relatively secure and stable system for movement of objects, that may be readily installed and removed. The objects may be any suitable objects for which mobility is desirable. According to a preferred embodiment, the objects are at least one of a refrigerated display case, a rack for mounting refrigeration system equipment and electrical distribution products and panels. The objects are intended to be designed with structure configured to mate with the removable caster system so that the casters and outrigger tubes may be readily interchangeable with the various objects. The removable caster system may be configured to provide any desirable number of casters and/or outrigger tubes for use with the object (e.g. 4, 6, 8, etc.) as deemed appropriate for the size, weight and shape of the object. The casters may be provided in any suitable size and made from any suitable material (e.g. hard rubber, plastic, etc.) and wheel locks may be provided with the casters to prevent unintended rolling of the object.

The construction and arrangement of the elements of the removable caster system as shown in the various embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the removable caster system may be constructed from any of a wide variety of materials and in any of a wide variety of colors, textures and combinations. Other substitutions, modifications, changes and omissions may be made in the design, operating conditions and arrangement of the various embodiments without departing from the scope of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the claims provided in any future patent applications that claim priority to this Application.

What is claimed is:

1. A refrigerated display case, comprising:
   a frame for the refrigerated display case, the frame including a first base frame member and a second base frame member;
   at least one aperture in the first base frame member and the second base frame member;
   a set of removable casters having a wheel coupled to a mounting base,
   at least one aperture in the mounting base configured to align with the at least one aperture in the first base frame member and the second base frame member;
   at least one pin member configured to extend through the aperture in the mounting base of the removable casters and through the aperture in the base frame members to removably couple the mounting base to the refrigerated display case;
   wherein the base frame members include a plurality of pairs of apertures and the removable casters are attachable to the base frame members at a plurality of locations to create an adaptable footprint for moving the case.

2. The refrigerated display case of claim 1 wherein the mounting base comprises flanges sized to engage sides of the base frame members.

3. The refrigerated display case of claim 1 wherein the mounting base is slidably received on the first base frame member and the second base frame member for adjustable placement therealong.

4. The refrigerated display case of claim 1 wherein the mounting base is coupled to a elongated member telescopingly received in one of the frame members.

5. A refrigerated display case, comprising:
   a frame for the refrigerated display case, the frame including a first base frame member and a second base frame member;
   a receiving structure on the first base frame member and the second base frame member;
   a set of removable casters having a wheel coupled to a mounting base, the mounting base for each removable caster including engaging structure attachable to the receiving structure on the base frame members to mount the casters on the frame of the refrigerated display case;
   wherein the receiving structure on the base frame members includes a plurality of pairs of apertures and the removable casters are attachable to the base frame members at a plurality of locations to create an adaptable footprint for moving the case;
   so that the set of removable casters may be attached to the refrigerated display case to facilitate mobility of the refrigerated display case and may be removed when the refrigerated display case is desired to remain stationary.

6. The refrigerated case of claim 5 wherein the engaging structure comprises one or more pins.

7. A refrigerated display case, comprising:
   a frame for the refrigerated display case, the frame including a lower base frame portion;
   one or more positioning devices on the lower base frame portion;
   a plurality of pairs of apertures on the lower base frame portion;
   a set of removable casters having a wheel coupled to a mounting base, the mounting base for each removable caster including engaging structure for connection with the apertures on the lower base frame portion, the mounting base for each caster also slidably engaging the lower base frame portion for movement of the casters between a plurality of positions defined by the positioning devices to align the engaging structure with the apertures, to mount the casters at a plurality of locations on the frame of the refrigerated display case to create an adaptable footprint for moving the case;
   so that the set of removable casters may be attached to the refrigerated display case in any one of a plurality of positions to facilitate mobility of the refrigerated display case and may be removed when the refrigerated display case is desired to remain stationary.

8. The refrigerated case of claim 7 wherein the engaging structure comprises one or more pins.

* * * * *